United States Patent
Locklear et al.

(10) Patent No.: US 12,129,437 B2
(45) Date of Patent: Oct. 29, 2024

(54) METHOD FOR THE DISSOLUTION OF AMORPHOUS DITHIAZINES

(71) Applicant: CONOCOPHILLIPS COMPANY, Houston, TX (US)

(72) Inventors: Jay Locklear, Houston, TX (US); David P. Cope, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 585 days.

(21) Appl. No.: 17/494,673

(22) Filed: Oct. 5, 2021

(65) Prior Publication Data

US 2022/0112443 A1   Apr. 14, 2022

Related U.S. Application Data

(60) Provisional application No. 63/234,398, filed on Aug. 18, 2021, provisional application No. 63/208,825, filed on Jun. 9, 2021, provisional application No. 63/184,469, filed on May 5, 2021, provisional application No. 63/111,841, filed on Nov. 10, 2020, provisional application No. 63/198,294, filed on Oct. 8, 2020.

(51) Int. Cl.
*C10G 29/28* (2006.01)
*C11D 3/34* (2006.01)

(52) U.S. Cl.
CPC .......... *C10G 29/28* (2013.01); *C11D 3/34* (2013.01); *C10G 2300/202* (2013.01); *C10G 2300/207* (2013.01); *C10G 2300/4075* (2013.01)

(58) Field of Classification Search
CPC .............. C10G 29/28; C10G 2300/202; C10G 2300/207; C10G 2300/4075; C11D 3/34
See application file for complete search history.

(56) References Cited

U.S. PATENT DOCUMENTS

| | | |
|---|---|---|
| 3,197,396 A | 7/1965 | Stedman |
| 4,978,512 A | 12/1990 | Dillon |

(Continued)

FOREIGN PATENT DOCUMENTS

| | | | | |
|---|---|---|---|---|
| WO | 2008049188 A1 | 5/2008 | | |
| WO | WO-2018001604 A1 * | 1/2018 | ............. | C09K 8/524 |

OTHER PUBLICATIONS

Taylor, G. N.; Matherly, R. Structural elucidation of solid byproduct from the use of 1,3,5-Tris(hydroxyalkyl) hexahydro-s-triazine based hydrogen sulfide scavengers. Industrial & Engineering Chemical Reserach. 2011, 50, 735-740.

(Continued)

*Primary Examiner* — Randy Boyer
*Assistant Examiner* — Juan C Valencia
(74) *Attorney, Agent, or Firm* — Boulware & Valoir PLLC

(57) ABSTRACT

The invention relates to the dissolution of amorphous dithiazine (a-DTZ) or polythioformaldehyde or other polymeric by-products of the treatment of hydrocarbon products (a-DZT) to remove them from surfaces. These are solids that build up on surfaces of processing plant and are resistant to most chemical treatment. The treatment requires treating the surface with an effective amount of a mercaptan or an amine. Surfactants to keep the dissolved a-DTZ or other components from redepositing elsewhere are also described, as is the use of hydrogen sulfide to add in removal by mercaptans.

20 Claims, 1 Drawing Sheet

(56) References Cited

U.S. PATENT DOCUMENTS

| | | |
|---|---|---|
| 5,104,557 A | 4/1992 | Lindstrom |
| 5,199,978 A | 4/1993 | Poirier et al. |
| 5,585,334 A | 12/1996 | Shaw |
| 5,618,408 A | 4/1997 | Poirier et al. |
| 8,920,568 B2 | 12/2014 | Taylor |
| 9,612,204 B2 | 4/2017 | Locklear et al. |
| 10,392,271 B2 | 8/2019 | Janson et al. |
| 10,564,142 B2 | 2/2020 | Oduro |
| 10,626,334 B2 | 4/2020 | Bertrand |
| 11,199,078 B2 | 12/2021 | Sharma et al. |
| 2013/0149788 A1 | 6/2013 | Sacks et al. |
| 2015/0267113 A1 | 9/2015 | Ramachandran et al. |
| 2021/0102932 A1 | 4/2021 | Locklear et al. |

OTHER PUBLICATIONS

International Search Report PCT/US2021/053589 (Dated Jan. 11, 2022).

\* cited by examiner

METHOD FOR THE DISSOLUTION OF AMORPHOUS DITHIAZINES

RELATED APPLICATIONS

This application claims priority to U.S. Ser. No. 63/198,294, filed Oct. 8, 2020 and 63/111,841, filed Nov. 10, 2020, and 63/208,825, filed Jun. 9, 2021, each incorporated by reference in its entirety for all purposes.

This application also claims priority to U.S. Ser. No. 63/184,469, filed May 5, 2021, and 63/234,398, filed Aug. 18, 2021, each incorporated by reference in its entirety for all purposes.

STATEMENT REGARDING FEDERALLY SPONSORED RESEARCH

Not applicable.

FIELD OF THE INVENTION

The invention relates to a method for removing amorphous dithiazine and similar compounds from a surface.

BACKGROUND OF THE INVENTION

Hydrogen sulfide (1425) and organic sulfides are found within geological formations associated with oil and gas reserves. Due to their toxicity and corrosive nature, they are generally reduced or removed from hydrocarbon streams during production in a process called "sweetening." A common approach to sweeten oil is to use an $H_2S$ scavenger, particularly triazine, which is produced by an aldehyde and an amine reaction. The $H_2S$ scavenger subsequently reacts with the hydrogen sulfide converting it to a more non-volatile product, which can be removed easily from the hydrocarbon stream. Typical formulations use a low molecular weight aldehyde such as formaldehyde, but ketones can also be used.

Triazine based H2S scavengers produce dithiaines upon reaction with H2S. In certain cases, the dithiazines can further react via polymerization to form a polymer colloquially known as amorphous dithiazine. Other compounds with similarities to amorphous dithiazine, such as polythioformaldehyde or, in general, polymeric compounds with chains comprising a mixture of S—C and S—S bonds, can also be by-products of sweetening processes. All the above compounds can form blockages, for example, in processing equipment, storage tanks, truck tanks, and water disposal wells.

Amorphous dithiazine can precipitate out under unfavorable solubility conditions in processing plants and equipment forming problematic deposits. Amorphous dithiazine deposits are a significant problem to the oil and gas industry and the industry places much effort and incurs great cost in the treatment of the buildup of amorphous dithiazine and similar compounds. Often, the equipment has to be taken off-line so the deposits can be manually chipped away.

Known methods of dissolving solid a-DZT and similar deposits include the use of a solution of hydrogen peroxide, which reacts and breaks up the amorphous dithiazine precipitates, facilitating removal. However, the hydrogen peroxide itself can lead to problems with corrosion of metal surfaces in a plant, especially carbon and stainless steel components.

Thus, there is a need for a safe and effective means for dissolving the build-up on surfaces of solid amorphous dithiazine or polythioformaldehyde or similar polymeric by-products of hydrocarbon sweetening processes.

BRIEF SUMMARY OF THE DISCLOSURE

The present disclosure discusses a method for dissolving amorphous dithiazines and similar deposits produced as a by-product of the reaction of $H_2S$ scavengers during hydrocarbon sweetening processes by treating with mercaptans or amines.

A typical reaction for the formation of dithiazines is shown in Eq. 1 below. Representative triazine $H_2S$ scavenger 1,3,5-tris(2-hydroxyethyl)hexahydro-s-triazine (I) reacts with $H_2S$ in the hydrocarbon stream to produce dithiazine (II). The $H_2S$ scavenger used in the reaction is typically produced in situ by reacting amines with aldehydes (or ketones). The dithiazines produces can further react in the reaction mixture and produce polymeric dithiazines that are usually insoluble amorphous dithiazines.

Eq. 1. Representative Reaction for the Formation of a-Dithiazine.

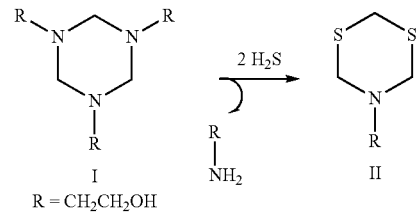

The amorphous dithiazine product is extremely insoluble and can precipitate out in substantial quantities in oil and gas processing systems forming blockages and/or causing fouling of heat exchangers, tubulars, tank trucks, water disposal wells, scrubbers, compressors, etc. The removal of these blockages is typically performed by taking the affected equipment offline and cleaning manually. This can be time consuming and cost ineffective. Use of hydrogen peroxide to dissolve the amorphous dithiazine is an operational method for remediation, but it has other prohibitive consequences like corrosion associated with peroxide use.

In the present invention, chemicals like thiols and mercaptans (RSH) are shown to be effective in dissolving amorphous dithiazines and methods and examples of the use of these compounds are described. The present methods include any of the following embodiments in any one or more combination(s) thereof:

A method of removing amorphous dithiazine from a surface comprising:
a) reacting amorphous dithiazine with an effective amount of a mercaptan;
b) wherein the mercaptan may be water soluble, may include a hydroxyl group or wherein the mercaptans may include, but are not limited to the following Methanethiol-CH3SH [methyl mercaptan]; Ethanethiol [ethyl mercaptan]; 1-Propanethiol [n-propyl mercaptan]; 2-Propanethiol [2C3 mercaptan]; Allyl mercaptan [2-propenethiol]; Butanethiol-C4H9SH [n-butyl mercaptan]; tert-Butyl mercaptan [t-butyl mercaptan]; Pentanethiols [pentyl mercaptan]; Thiophenol; Dimercaptosuccinic acid; Thioacetic acid; 2-Mercaptoethanol [BME]; Dithiothreitol/dithioerythritol (an epimeric pair); 2-Mercaptoindole; Furan-2-ylmethanethiol;

3-Mercaptopropane-1,2-diol; 3-Mercapto-1-propanesulfonic acid; 1-Hexadecanethiol; Pentachlorobenzenethiol.

Any of the described methods wherein the mercaptan is in aqueous solution at pH between 4 and 7.

Any of the herein described methods wherein an effective concentration of $H_2S$ is maintained to increase the rate of dissolution of a-DZT, Any of the herein described methods wherein a partial pressure of hydrogen sulfide is maintained over the reacting aDZT and mercaptan to increase the rate of dissolution of the a-DZT.

In another embodiment of the present disclosure, amines are added to dissolve the a-DZT. The amines are selected from a group consisting of alkyl aminem alkyl-hydroxy amines, amino acids, amino saccharides, diamines, triamines, alkyl benzyl amines or combinations thereof.

In some embodiments, surfactants are added to the reaction mixture before, with or after the amine addition. These surfactants are selected from a group consisting of ethoxylated tetraethylene pentamine; ethoxylated hexamethylene diamine dimethyl quat; ethoxysulfated hexamethylene diamine dimethyl quat; ethoxysulfated hexamethyl tri(amine methyl quat); propoxysulfated hexamethylene diamine dimethyl quat; ethoxy hexamethylene poly(amine benzyl quat); ethoxysulfated hexamethylene poly(amine benzyl quat); ethoxylated 4,9-dioxa-1,12-dodecanediamine dimethyl quat tetrasulfate; propoxylated-ethoxylated benzyl-quaternized trans-sulfated bis(hexamethylene)triamine; 50% sulfonated, propoxylated, ethoxylated methyl quat of hexamethylene diamine; benzyl quaternary ammonium; mono- or di alkyl ammonium chloride with alkyl chains of C6-C30; and mixtures thereof.

The term "substantially," as used herein, is defined to be essentially conforming to the particular dimension, shape or other word that substantially modifies, such that the component need not be exact. For example, substantially cylindrical means that the object resembles a cylinder, but can have one or more deviations from a true cylinder.

The use of the word "a" or "an" in the claims or the specification means one or more than one, unless the context dictates otherwise.

The term "about" means the stated value plus or minus the margin of error of measurement or plus or minus 10% if no method of measurement is indicated.

The use of the term "or" in the claims is used to mean "and/or" unless explicitly indicated to refer to alternatives only or if the alternatives are mutually exclusive.

The terms "comprise", "have", "include" and "contain" (and their variants) are open-ended linking verbs and allow the addition of other elements when used in a claim. The phrase "consisting of" is closed, and excludes all additional elements. The phrase "consisting essentially of" excludes additional material elements, but allows the inclusions of non-material elements that do not substantially change the nature of the invention, such as instructions for use, buffers, minor additives and the like. Any claim or claim element introduced with the open transition term "comprising," may also be narrowed to use the phrases "consisting essentially of" or "consisting of," and vice versa. However, the entirety of claim language is not repeated verbatim in the interest of brevity herein.

DETAILED DESCRIPTION

Figure 1:
FIG. 1 is a photograph showing the vial from Comparative Example 1 after 7 hours.

Amorphous dithiazine is a substance well known in the oil and gas industry in the form of a solid deposit that is a byproduct of a sweetening process to remove hydrogen sulfide using amine based organic chemicals. Amorphous dithiazine deposits may vary in absolute composition—the polymer contains at least in part S—C and S—S bonds as the primary polymeric backbone. The exact ratio of these varies with process conditions. Proposed amorphous dithiazine structures are shown in structures (I) and (II) below. These structures are detailed in Ind. Eng. Chem. Res., Vol. 50, No. 2, 2011, Structural Elucidation of the Solid Byproduct from the Use of 1,3,5-tris(hydroxyalkyl)hexahydro-s-triazine Based Hydrogen Sulfide Scavengers, Grahame N. Taylor and Ron Matherly, B. J. Services Company, Tomball, Texas 77375, United States.

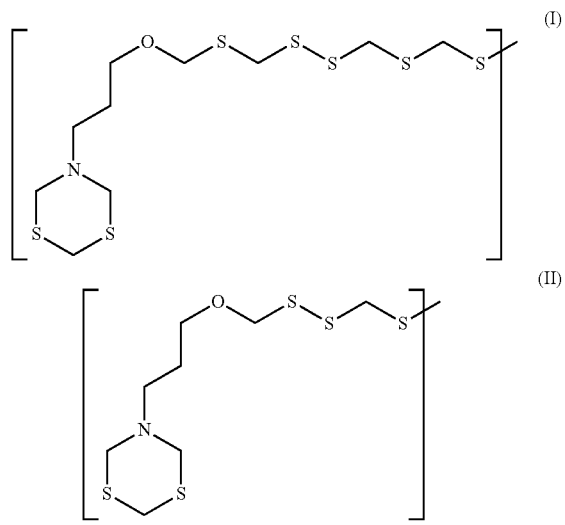

As explained, amorphous dithiazine is a polymeric compound with a chain comprising S—C and S—S bonds. Its name generally references its typical origin from dithiazine reaction product of the MEA triazine and hydrogen sulfide reaction. However, other similar polymers may also be produced in the sweetening process. These polymers may also have a chain comprising a mixture of S—C and S—S bonds but the chain may terminate differently and/or originate from different scavenging species. For example, MEA triazine can hydrolyze to formaldehyde and MEA under certain process conditions. The resulting formaldehyde can react with hydrogen sulfide to produce polythioformaldehyde, a compound similar to amorphous dithiazine (molecule (I)) with different terminal groups (like H or $CH_3$). As with amorphous dithiazine, there are likely structural variants on the polymer backbone and terminal groups.

The inventors performed experiments to find compounds that may effectively dissolve a-DTZ and like compounds. Based on this work, they have found that thiols/mercaptans and/or amines effectively dissolve a-DTZ and polythioformaldehyde or similar insoluble polymeric by-products of the sweetening process that have mixed S—C and S—S chains. They also show that surfactants will keep the dissolved components from depositing elsewhere in the process.

Thiols/Mercaptans

The inventors believe that thiols/mercaptans in general may effectively dissolve a-DTZ and polythioformaldehyde or similar insoluble polymeric by-products of the sweetening process which have mixed S—C and S—S chains. It is generally understood that the mercaptan/thiol attacks the S—S bonds in the chain, breaking down the polymer and allowing the dissolution of fragments and subsequent removal of the smaller fragments from the production system. Although only limited experimental work has been done to date, the inventors consider that thiols/mercaptans may be capable of dissolving effectively any polymeric by-product of sweetening which has a similar S—C and S—S chain to a-DTZ.

Soluble mercaptans are preferred for this reaction, e.g. reducing agents like 2-mercaptoethanol (aka beta-mercaptoethanol or BME), dithiothreitol (DTT) or tris(2-carboxyethyl)phosphine (TCEP). BME is a common, and relatively benign, oilfield chemical that is readily available. BME is used in the oilfield for other purposes like synergist for corrosion inhibitors, a cleaning agent, tin stabilizer in PVC production, etc. and is thus suited for this application.

An example and a comparative example are presented below, and further experimental work is planned. In the meantime, the inventors have also performed some preliminary investigations comparing the effect of the BME of Example 2 with a commercially available caustic amine-based product for removing a-DTZ from surfaces, and found the BME solution more effective at dissolving a-DTZ. The inventors have also found that the BME is most effective in a pH range of 4 to 7. Amines, by contrast, are a catalyst for the dissolution that do not work well at neutral pHs, but are better at basic pH levels.

Amines

Amines (primary, secondary, tertiary and quaternary) may effectively and quickly dissolve a-DTZ and polythioformaldehyde or similar insoluble polymeric by-products of the sweetening process that have mixed S—C and S—S chains.

Amines for use in the invention can be selected from a group comprising alkyl amines, alkyl-hydroxy amines, amino acids, amino saccharides, diamines, triamines, alkyl benzyl amines, or combinations thereof. Alternatively, the amines are selected from a group comprising methylamine, propylamine, monoethanolamine, isopropanolamine, tris(2-aminoethyl)amine, glucosamine, ethylene diamine, diethanolamine, diisopropanolamine, methyldiethanolamine, triethanolamine, diethylenetriamine, pyrrolidone, or derivatives thereof. Additional amines include triethylamine, 1-methyl-2-pyrrolidinone, monoethanolamine, triethanolamine, diethanolamine, methyldiethanolamine, N,N-dimethyl-N-(2-hydroxypropyl)amine, N,N,N'-trimethyl-N'-(2-hydroxypropyl)ethylenediamine, N,N,N',N''-tetramethyl-N''-(2)-hydroxypropyl)diethylenetriamine, N,N,N',N'',N'''-pentamethyl-N'''-(2-hydroxypropyl)triethylenetetramine, and the like.

In some embodiments of the presently disclosed methods, amines may also be added to the fluids or surfaces to be treated alongside the mercaptans and thiols to catalyze the dissolution reaction of the a-DTZ and polythioformaldehyde.

Surfactants

In addition to thiols/mercaptans and amines, adding surfactants to the treated fluids may also help keep the a-DTZ and polythioformaldehyde or similar insoluble polymeric by-products dissolved or suspended, thus preventing them from depositing elsewhere.

BME and its disulfide have some surfactancy qualities, but stronger surfactants may be added to enhance dissolution by mobilizing and/or dispersing the undissolved material after the formal chemical reaction is complete. Specifically, the addition of surfactants will help keep the dissolved a-DTZ and polythioformaldehyde, or similar insoluble polymeric components in solution and prevent them from depositing elsewhere in the process.

The surfactants used in the presently described methods can be cationic, anionic, non-ionic, or combinations thereof. Exemplary surfactants for use alone, or in combination with thiols/mercaptans, include quaternary ammonium ("quats") surfactants (QAS); gemini quaternary ammonium surfactant; linear alkylbenzene or branched alkylbenzene sulfonates; and ethoxylates. Other possible surfactants include ethoxylated tetraethylene pentamine; ethoxylated hexamethylene diamine dimethyl quat; ethoxysulfated hexamethylene diamine dimethyl quat; ethoxysulfated hexamethyl tri(amine methyl quat); propoxysulfated hexamethylene diamine dimethyl quat; ethoxy hexamethylene poly (amine benzyl quat); ethoxysulfated hexamethylene poly (amine benzyl quat); ethoxylated 4,9-dioxa-1,12-dodecanediamine dimethyl quat tetrasulfate; propoxylated-ethoxylated benzyl-quaternized trans-sulfated bis (hexamethylene)triamine; 50% sulfonated, propoxylated, ethoxylated methyl quat of hexamethylene diamine; benzyl quaternary ammonium; mono- or di alkyl ammonium chloride with alkyl chains of C6-C30; and mixtures thereof.

The surfactants can be added before treatment and before the addition of mercaptans, thiols, and/or amines, or along with the mercaptans, thiols, and/or amines; or after the addition of the mercaptans, thiols, and/or amines.

It may also be possible, whilst treating a plant to remove deposits of amorphous dithiazine or polythioformaldehyde, to maintain a partial pressure of hydrogen sulfide within the plant or within the part of the plant being treated. The plant would normally be a hydrocarbon oil or gas production or processing plant, such as plant for removing hydrogen sulfide from hydrocarbon oil or gas. The treatments can include thiols/mercaptans, surfactants, and/or amines in any combination.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

Comparative Example 1

Caustic amine solution [9% potassium hydroxide, 12% amine] (a common chemical in use for removal of a-DTZ) was added to a vial containing solid amorphous dithiazine obtained from an $H_2S$ scavenging system and the contents of the vial were maintained at 70° C. After 7 hours the contents of the vial included a considerable amount of visible solid matter. FIG. 1 is a photograph of the vial after 7 hours.

Example 2

Figure 2:
FIG. 2 is a photograph showing the vial from Example 2 after 7 hours.

An industrial chemical containing ~50:50 water:2-mercaptoethanol ($C_2H_6OS$) was added to a vial containing solid amorphous dithiazine obtained from an $H_2S$ scavenging system and the contents of the vial were maintained at 70° C. After 2 hours the contents of the vial showed no visible solid matter. FIG. 2 is a photograph of the vial after 2 hours.

Further informal experimental work suggest that hydrogen sulfide appears to evolve during the reaction or reactions associated with the dissolution of amorphous dithiazine with mercaptans.

Hydrogen sulfide may play a role in the dissolution of amorphous dithiazine with mercaptans. While not fully understood, the presence of hydrogen sulfide (whether evolved in the reactions or not) appears to increase the total amount of amorphous dithiazine dissolved per gram of mercaptan. It is likely this dissolution effect exists because of complex equilibria between hydrogen sulfide, amorphous dithiazine, mercaptan and the disulfide formed from the mercaptan.

For example, it appears positively to affect the rate of reaction if a partial pressure of hydrogen sulfide is maintained over the reaction mixture. The rate of reaction may be increased twofold or more, such as by a factor of 2 to 5, by having hydrogen sulfide present.

These results may also apply to dissolution of polythioformaldehyde.

REFERENCES

All of the references cited herein are expressly incorporated by reference. The discussion of any reference is not an admission that it is prior art to the present invention, especially any reference that may have a publication data after the priority date of this application. References are listed again here for convenience, and each is incorporated by reference in its entirety for all purposes:
1. U.S. Pat. No. 9,612,204 (ConocoPhillips) "Measurement of Scale Inhibitor in Water Systems"
2. U.S. Ser. No. 10/392,271 (ConocoPhillips) "Method of Removing Hydrogen-Sulfide from Water"
3. US2012247515 (Baker Hughes) "Method for the Dissolution of Amorphous Dithiazine."
4. US2016362315 (ConocoPhillips) "Treatment of OTSG Blowdown."
5. U.S. Ser. No. 17/062,281 (ConocoPhillips) "Elemental Sulfur Analysis in Fluids"
6. G. N Taylor and R. Matherly "Structural Elucidation of the Solid Byproduct from the Use of 1,3,5-tris(hydroxyalkyl)hexahydro-s-triazine Based Hydrogen Sulfide Scavengers," Ind. Eng. Chem. Res., Vol. 50, No. 2, 2011. DOI: 10.1021/ie101985v

What is claimed is:

1. A method of removing amorphous dithiazine or polythioformaldehyde or polymeric by-products of hydrocarbon sweetening processes (herein an "a-DZT") from a surface, said method comprising reacting said a-DZT at least partially coating said surface with an effective amount of a mercaptan or an amine to remove at least a portion of said a-DZT, thereby cleaning said surface, wherein said method excludes use of a peroxide.

2. The method of claim 1, said method being carried out in the presence of hydrogen sulfide.

3. The method of claim 2, wherein said hydrogen sulfide is present in an amount effective to increase removal of a-DZT from said surface.

4. A method of, removing amorphous dithiazine or polythioformaldehyde or polymeric by-products of hydrocarbon sweetening processes (herein an "a-DZT") from a surface, said method comprising:
   a) reacting said a-DZT at least partially coating said surface with an effective amount of a mercaptan or an amine in the presence of hydrogen sulfide thereby at least partially removing at least a portion of said a-DZT, thereby cleaning said surface;
   b) wherein a rate of removal of said a-DZT is increased by a factor of 2 or more relative to a rate of removal of said a-DZT with essentially no hydrogen sulfide present.

5. The method according to claim 4, wherein a partial pressure of hydrogen sulfide vapor is maintained over said reacting a-DZT and mercaptan or amine.

6. The method of claim 1, said method being carried out in the presence of a surfactant.

7. The method of claim 6, wherein said surfactant is a cationic, anionic, or non-ionic surfactant.

8. The method of claim 6, wherein said surfactant is selected from a group consisting of ethoxylated tetraethylene pentamine; ethoxylated hexamethylene diamine dimethyl quat; ethoxysulfated hexamethylene diamine dimethyl quat; ethoxysulfated hexamethyl tri (amine methyl quat); propoxysulfated hexamethylene diamine dimethyl quat; ethoxy hexamethylene poly (amine benzyl quat); ethoxysulfated hexamethylene poly (amine benzyl quat); ethoxylated 4,9-dioxa-1,12-dodecanediamine dimethyl quat tetrasulfate; propoxylated-ethoxylated benzyl-quaternized trans-sulfated bis(hexamethylene)triamine; 50% sulfonated, propoxylated, ethoxylated methyl quat of hexamethylene diamine; benzyl quaternary ammonium; mono- or di alkyl ammonium chloride with alkyl chains of C6-C30; and mixtures thereof.

9. The method of claim 1, wherein said mercaptan is a water soluble mercaptan.

10. The method of claim 1, wherein said mercaptan includes a hydroxyl group.

11. The method of claim 1, wherein said mercaptan is selected from methanethiol; ethanethiol; 1-propanethiol; 2-propanethiol; allyl mercaptan; butanethiol; tert-butyl mercaptan; pentanethiol; thiophenol; dimercaptosuccinic acid; thioacetic acid; 2-mercaptoethanol; dithiothreitol/dithioerythritol (an epimeric pair); 2-mercaptoindole; furan-2-ylmethanethiol; 3-mercaptopropane-1,2-diol; 3-mercapto-1-propanesulfonic acid; 1-hexadecanethiol; pentachlorobenzenethiol, or combinations thereof.

12. The method of claim 1, wherein said mercaptan is 2-mercaptoethanol.

13. The method of claim 1, wherein said mercaptan is in aqueous solution at a pH between 4 and 7.

14. The method of claim 4, wherein said amine is selected from a group consisting of alkyl amines, alkyl-hydroxy amines, amino acids, amino saccharides, diamines, triamines, alkyl benzyl amines, methylamine, propylamine, monoethanolamine, isopropanolamine, tris(2-aminoethyl) amine, glucosamine, ethylene diamine, diethanolamine, diisopropanolamine, methyldiethanolamine, triethanolamine, diethylenetriamine, pyrrolidone, triethylamine, 1-methyl-2-pyrrolidinone, monoethanolamine, diethanolamine, methyldiethanolamine, N,N-dimethyl-N-(2-hydroxypropyl)amine, N,N,N'-trimethyl-N'-(2-hydroxypropyl)ethylenediamine, N,N,N',N"-tetramethyl-N" (2)- hydroxypropyl) diethylenetriamine, N,N,N',N'',N'''-pentamethyl-N''-(2-hydroxypropyl)triethylenetetramine, or and combinations thereof.

15. The method of claim 14, further comprising adding a surfactant to said a-DZT before, with or after said amine.

16. The method of claim 14, wherein said amine is at a basic pH.

17. A method of removing amorphous dithiazine or polythioformaldehyde or polymeric by-products of hydrocarbon sweetening processes (a-DZT) from a surface, wherein said method excludes use of a peroxide, said method comprising reacting said a-DZT at least partially coating said a surface with an effective amount of a mercaptan to remove at least a portion of said a-DZT, thereby cleaning said surface, said mercaptan at a pH of 4-7 and selected from methanethiol; ethanethiol; 1-propanethiol; 2-propanethiol; allyl mercaptan; butanethiol; tert-butyl mercaptan; pentanethiol; thiophenol; dimercaptosuccinic acid; thioacetic acid; 2-mercaptoethanol; dithiothreitol/dithioerythritol (an epimeric pair); 2-mercaptoindole; furan-2-ylmethanethiol; 3-mercaptopropane-1,2-diol; 3-mercapto-1-propanesulfonic acid; 1-hexadecanethiol; pentachlorobenzenethiol or combinations thereof.

18. The method according to claim 17, further including treating with a cationic, anionic, or non-ionic surfactant or hydrogen sulfide or both.

19. A method of removing amorphous dithiazine or polythioformaldehyde or polymeric by-products of hydrocarbon sweetening processes (a-DZT) from a surface, said method comprising reacting said a-DZT on said a surface with an effective amount of an amine at a basic pH to remove at least a portion of said a-DZT from said surface, wherein said amine is selected from a group consisting of alkyl amines, alkyl-hydroxy amines, amino acids, amino saccharides, diamines, triamines, alkyl benzyl amines, methylamine, propylamine, monoethanolamine, isopropanolamine, tris(2-aminoethyl)amine, glucosamine, ethylene diamine, diethanolamine, diisopropanolamine, methyldiethanolamine, triethanolamine, diethylenetriamine, pyrrolidone, triethylamine, 1-methyl-2-pyrrolidinone, monoethanolamine, diethanolamine, methyldiethanolamine, N,N-dimethyl-N-(2-hydroxypropyl)amine, N,N,N'-trimethyl-N'-(2-hydroxypropyl)ethylenediamine, N,N,N',N''-tetramethyl-N''-(2)-hydroxypropyl) diethylenetriamine, N,N,N',N'',N'''-pentamethyl-N'''-(2-hydroxypropyl)triethylenetetramine, and or combinations thereof.

20. The method according to claim 19, further including treating with a cationic, anionic, or non-ionic surfactant or hydrogen sulfide or both.

* * * * *